United States Patent [19]

Rudiger

[11] Patent Number: 4,606,220
[45] Date of Patent: Aug. 19, 1986

[54] APPARATUS FOR LOCATING LEAKS IN A HEAT EXCHANGER

[76] Inventor: Emil Rudiger, S.S. 2, Site 18, Compartment 10, Fort St. John, British Columbia V1J 4M7, Canada

[21] Appl. No.: 709,603

[22] Filed: Mar. 8, 1985

[51] Int. Cl.⁴ .............................................. G01M 3/28
[52] U.S. Cl. ................................................. 73/40.5 R
[58] Field of Search .............................. 73/40.5 R, 40

[56] References Cited

FOREIGN PATENT DOCUMENTS 82427 7/1981 Japan .............................. 73/40.5 R Primary Examiner—Stewart J. Levy
Assistant Examiner—Joseph W. Roskos
Attorney, Agent, or Firm—D. Ron Morrison

[57] ABSTRACT

Apparatus for locating leaks in a heat exchanger of a type having a plurality of tubular elements supported at one end by a fixed tube sheet and at the other end by a floating tube sheet, contained within an elongated cylindrical housing with the housing having flanges for attachment thereto by end vessels. The apparatus includes an elastomeric sleeve couplable, after removal of the end vessels, to a flange of the housing adjacent the floating tube sheet, with provision being made for affixing the sleeve in sealed contact with the flange and also for sealing the elastomeric sleeve to the floating tube sheet. With the apparatus in place the chamber surrounding the tubular elements and between the tube sheets is pressurized with fluid and the ends of each tube and tube sheet inspected at the same time for fluid leaks.

10 Claims, 3 Drawing Figures

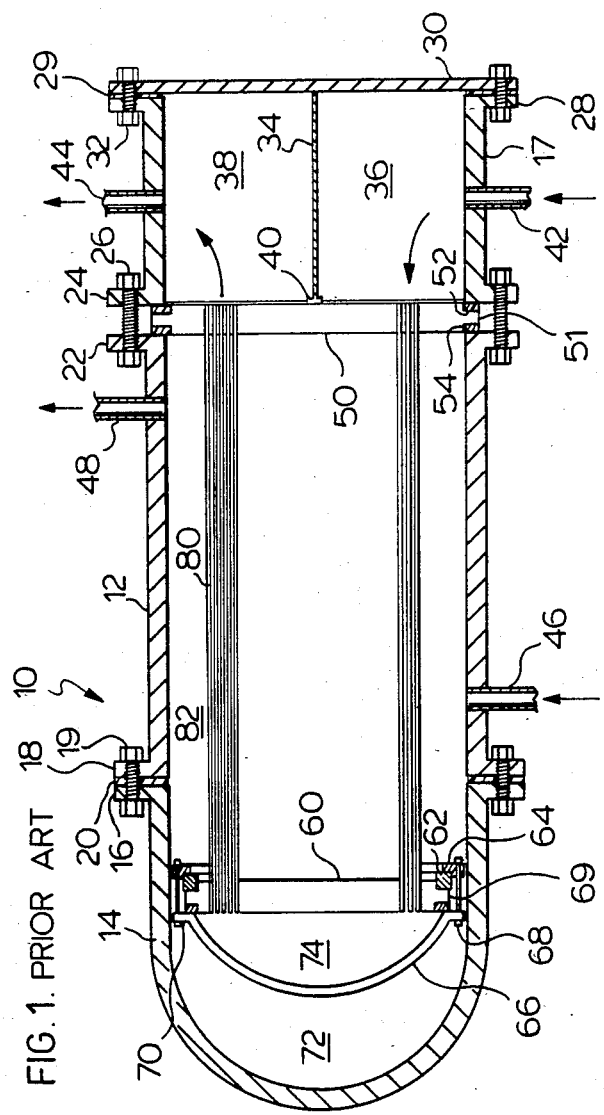

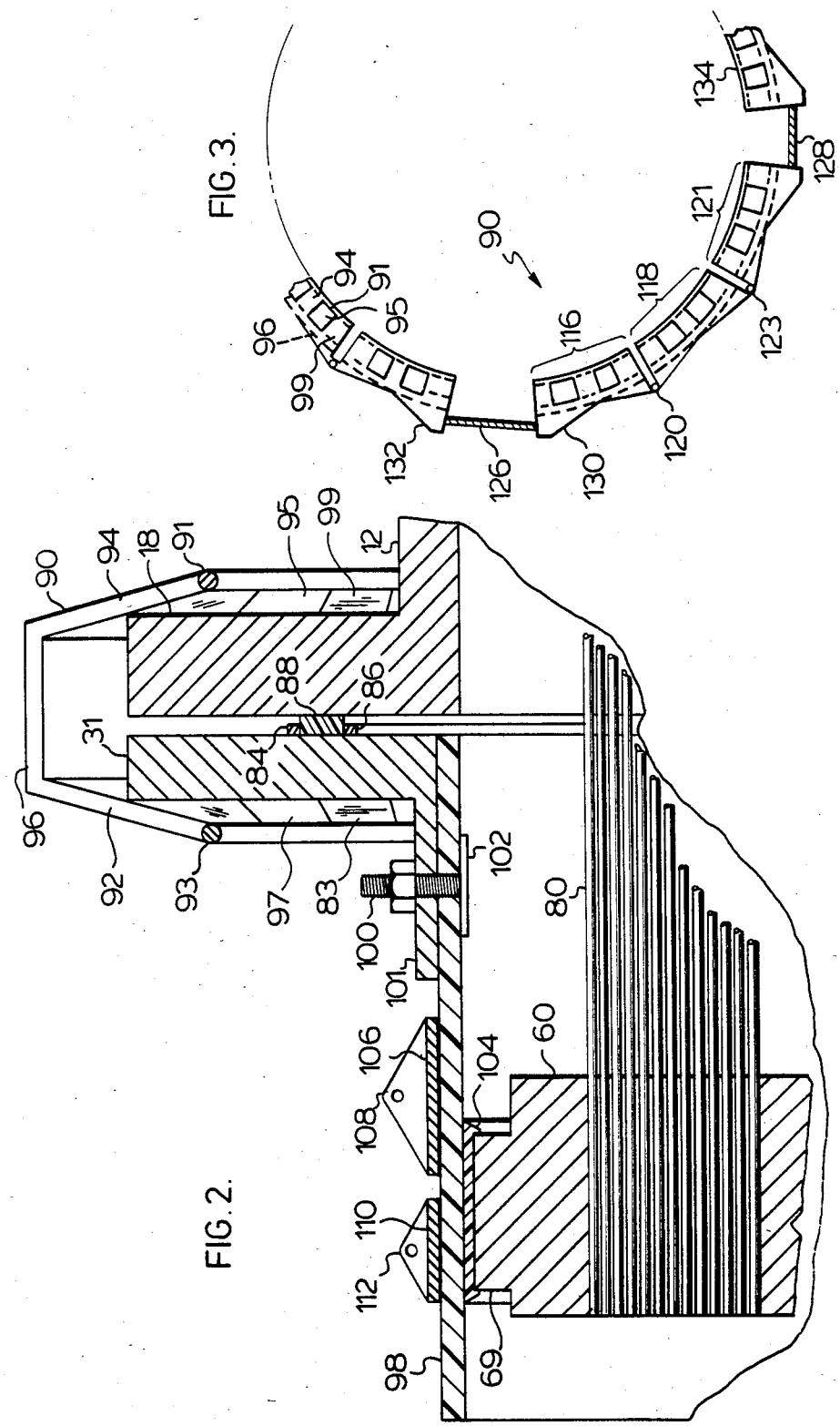

APPARATUS FOR LOCATING LEAKS IN A HEAT EXCHANGER

BACKGROUND OF THE INVENTION

The present invention relates to an apparatus for locating leaks in a conventional heat exchanger which has a plurality of tubes mounted at either end in a tube sheet.

A common form of heat exchanger used in industrial applications consists of a cylindrical elongated chamber having a dome-shaped cap or derby head at one end. A plurality of closely spaced elongated tubes are mounted in associated corresponding bores in each of two spaced apart tubes sheets at either end of the vessel. The tubes are open at both ends. At the end of the vessel opposite the derby head there is a header divided into an inlet chamber and an outlet chamber and containing a fluid inlet in the inlet chamber and a fluid outlet in the outlet chamber. The space around the tubes also has a fluid inlet proximate one end of the tubes and a fluid outlet proximate the other end. Fluid is ordinarily pumped into the header inlet, passes through those tubes which communicate with the inlet chamber through to the opposite end proximate the derby head and then flow back to the outlet chamber through those tubes which communicate with the latter. Heat is exchanged with fluid that passes through the central portion of the vessel around the elongated tubes. Consequently, any leaks in the tubes themselves or in the space between the tube sheets and the tubes can result in contamination of the fluids between which heat is being exchanged.

The common procedure for testing for leaks in the tubes includes removing a plate covering the header as well as the derby head and, in succession, plugging each tube at one end and pressurizing it at the other. Any leaks will result in fluid passing out of the fluid inlet for a particular tube having a leak.

In an assembly having 1,000 or more tubes, which is a common type of vessel, such a procedure involves shutting down the heat exchanging system for several days while each tube is tested in succession. Clearly, such a procedure is time-consuming and costly. Moreover, the foregoing procedure is not capable of locating leaks between the tubes sheets and the tubes.

SUMMARY OF THE INVENTION

According to the invention there is provided an apparatus for locating leaks in a heat exchanger of a type having a plurality of tubular elements supported at one end by a fixed tube sheet and at the other end by a floating tube sheet contained within a central elongated cylindrical housing enclosing the tubular elements with housing flanges on opposite ends thereof. The apparatus includes an elastomeric sleeve couplable to a corresponding flange of the housing, means for affixing the sleeve with the corresponding flange in sealing contact therewith and means for sealing the elastomeric sleeve with the floating tube sheet.

By pressurizing the central elongated housing enclosing the tubular elements, any leaks between the tube sheets and the tubes will be readily visible by simply observing the areas arounds the ends of the tube sheets which are exposed. Similarly, any leaks in any of the tubes will be indicated by fluid flowing out of those tubes. Thus, the apparatus is capable of checking for leaks in all of the tubes and between all of the tube sheets and tubes in one single pressurizing operation.

Moreover, any expansion or contraction of the tubes is accomodated for by the stretching capability of the elastomeric sleeve.

Preferably the affixing means includes a flange coupling, sealingly couplable to the housing flange and to the elastomeric sleeve.

The affixing means also includes an annular assembly with a plurality of radial segments, each of the radial segments having a plurality of radial sections and each of the sections pivotally coupled to an adjacent section. Each of the sections in cross section have a pair of side walls whose interior surfaces diverge toward a center of the assembly and when in place contact the housing flange and the flange coupling intermediate the side walls. Each segment is coupled to an adjacent segment by tensioning means.

By utilizing a clamp which engages the flanges being sealed together along its opposed inclined interior side walls and which includes a plurality of sections pivoted one to the other, any movement of the flange coupling as a result of sagging of the tubes can be accomodated for inasmuch as the flange is capable of moving relative to the flange of the flange coupling while still maintaining a clamping force around the periphery of the two flanges.

The flange assembly may include a pair of spaced apart rings on a flange of the flange coupling forming a seal groove therebetween, and a resilient seal, slidably snugly insertable in the groove. The thickness of the seal is greater than that of the rings so that upon tightening of the flange of the flange coupling to the housing flange the seal compresses and seals the housing flange to the flange coupling.

The flange coupling may include a cylindrical coupling sleeve slidably engageable with the elastomeric sleeve, with both of the sleeves having bolt holes spaced therearound, alignable upon engagement of the sleeves. Upon being bolted together the coupling sleeve and the elastomeric sleeve become sealed.

The tube sheet sealing means may include a resilient tube sheet seal clamp for engaging a periphery of the tube sheet and a clamp for clamping the elastomeric sleeve around the tube sheet seal and the tube sheet periphery.

The tube sheet seal is preferably an annular seal with opposed lips for engaging a periphery and portions of the side walls of the tube sheet.

BRIEF DESCRIPTION OF THE DRAWINGS

In drawings of a preferred embodiment of the device,

FIG. 1 illustrates in cross section a prior art embodiment of a tubular heat exchanger to which the present invention is applicable;

FIG. 2 illustrates the apparatus used for sealing a tube sheet at one end of the structure of FIG. 1 to a housing flange of the housing; and FIG. 3 illustrates a partial front elevation view of the flange clamp shown in FIG. 2.

DETAILED DESCRIPTION WITH REFERENCE TO THE DRAWINGS

A tubular heat exchanger as shown in FIG. 1 of a type to which the present invention is applicable and which is in common use includes a housing 12, having flanges 18 and 22 at either end thereof and an inlet port 46 and an outlet port 48 proximate opposite ends of the housing 12. Housing 12 is couplable to a derby or end cap 14 having flange 16 by means of bolts 19 passing through bolt holes in each of the flanges 16 and 18. A seal 20 seals the area between the two flanges 16 and 18. At the opposite end a tube sheet 50 having a plurality of tube holes therein for receiving one end of elongated tubes 80 and having a narrowed peripheral portion 51 in order to accomodate annular seals 52 and 54 is compressed between housing flange 22 and a channel head flange 24 of channel head housing 17. Bolts 26 secure the two flanges 22 and 24 together. At the opposite end of channel head 17 a dollar plate 30 is secured by bolts 32 to channel head flange 28 and an intermediate seal 29 compresses to seal the dollar plate 30 to the channel head flange 28. A flat plate 34 affixed to the dollar plate 30 is compressed against a diametrical flange 40 which is coupled to seal 52. Plate 34 divides the interior of channel head housing 17 into an inlet chamber 36 and an outlet chamber 38. Channel head housing 17 has an inlet port 42 and an outlet port 44.

Tubes 80 are supported at their opposite ends by a tube sheet 60 which is free to move in derby housing 14 along the length thereof. Tube sheet 60 is clamped to a dome 66 by means of a split ring 62 contacting a shoulder of narrowed annular tube sheet portion 69. A clamping ring 64 engages the split ring 62 and itself is clamped to a dome housing by means of bolts 68. Dome flange 70 contacts a seal adjacent the opposite shoulder of tube sheet portion 69. The entire structure has sufficient clearance from the interior surface of derby hat housing 14 to enable it to move back and forth upon expansion or contraction of tubes 80.

The interior of heat exchanger housing 12 defines a tube chamber 82. The area between dome 66 and tube sheet 60 defines a dome chamber 74, while that between the dome 66 and the derby head 14 defines a derby head chamber 72.

In operation, fluid is directed into inlet port 42 and inlet chamber 36 whereupon it enters half of the tubes 80, whose open ends communicate with inlet chamber 36 and flow along the latter tubes towards dome chamber 74. Upon reaching dome chamber 74 the fluid then enters the other half of tubes 80 which communicate with outlet chamber 38. After reaching outlet chamber 38 the fluid then exits via outlet port 44. A second fluid flow is established by fluid entering heat exchanger housing inlet 46, which passes through the closely spaced tubes 80 and exits via outlet port 48. Heat is thus exchanged between the fluid in tube chamber 82 and the fluid passing through the tubes 80. Occasionally leaks develop either in the tubes 80 or in the space between the tube sheet holes and the tubes 80.

The present apparatus in testing for leaks in the vessel of FIG. 1 is illustrated in part in FIG. 2. An elastomeric cylindrical sleeve 98 is fitted into a flange coupling sleeve 101 having a flange 31. Bolt holes in elastomeric sleeve 98 mate with corresponding bolt holes in flange coupling sleeve 101. Bolts 100 having wide heads 102 for contacting the elastomeric sleeve 98 are fitted through the aligned bolt holes and tightened. The wide heads 102 and relatively close spacing of the holes ensure that elastomeric sleeve 98 is sealed against flange coupling sleeve 101. Next a tube sheet sleeve 104 is fitted over a periphery 69 of tube sheet 60 and has portions on either end thereof which contact portions of the side wall of narrowed portion 69 of tube sheet 60.

A seal 88 is then fitted between a pair of spaced apart concentric rings 84 and 86, defining a groove therebetween. Flange 31 and sleeve 98 are then fitted over seal 104 until flange 31 abuts housing flange 18. An annular clamping assembly 90 also as illustrated in FIG. 3 is fitted around a periphery of flanges 18 and 31.

As shown in FIG. 3, annular clamp 90 consists of four sets or segments of three radial sections with adjacent radial sections of a set pivotally coupled together. Thus radial sections 116, 118 and 121 are pivotally coupled by pivotal connections 120 and 123. End section 116 and 121 are coupled to sections 124 and 134, respectively, of adjacent sets of sections by means of screw fasteners 126 and 128. Each section, as shown in FIG. 2, has a pair of walls 92 and 94 which diverge towards an open end and couple to rims 93 and 91, respectively, which run from one end of a given section to the other. Open spaces 95 and 97 are located intermediate walls 92 and 94 and adjacent walls 83 and 99, respectively. Flanges 18 and 31 contact side walls 94 and 92, respectively, intermediate thereof. The wedging action of side walls 92 and 94 result in compression of the seal 88 and sealing of the two flanges 18 and 31 together. In the event of any temperature change or sag of the tubes 80, flange 31 may be drawn out of alignment with flange 18 in which case walls of clamp 90 simply slide so as to maintain contact with both flanges 18 and 31. This sliding action is possible because of the pivotal connections between each section of clamp 90.

Once clamp 90 is in place, clamps 108 and 112 are tightened, thereby sealing the elastomeric tube 98 against the seal 104. Clamps 108 and 112 consist of a strip or band of metal wound onto itself for a portion thereof, so that during tightening there is a metal to metal sliding action rather than metal against the elastomeric sleeve 98.

With the apparatus illustrated in FIGS. 2 and 3 in place, tube chamber 82 is then pressurized with fluid and the ends of tube sheets 60 and 50 observed. Should there be any leaks in any of the tubes 80, fluid will be forced out of the tube and will be observed at the end of the tube sheet. Any leaks between the tube sheets 50 or 60 and any of the tubes 80 will be observed in the same way by inspecting for fluid running out from the joints between the tubes and the tube sheet. Thus, by one simple pressurizing operation, leaks may be detected in any of the tubes or between any of the tubes and corresponding tube sheet holes.

Other variations, departures and modifications lying within the spirit of the invention and scope as defined by the appended claims will be obvious to those skilled in the art.

I claim:

1. Apparatus for locating leaks in a heat exchanger of a type having a plurality of tubular elements supported at one end by a fixed tube sheet and at the other end by a floating tube sheet contained within an elongated cylindrical housing with the housing having flanges for attachment thereto by end vessels, comprising:

(a) an elastomeric sleeve couplable to a corresponding flange of said housing proximate said floating tube sheet;

(b) means for affixing said sleeve with said corresponding flange in sealing contact therewith;

(c) means for sealing said elastomeric sleeve to said floating tube sheet, and (d) means for applying pressure to fluid in said heat exchanger between the tubular elements when the elastomeric sleeve is coupled to the housing in sealing contact with said corresponding flange and with said floating tube sheet, whereby any leak in any of said tubular elements with be observed by the appearance of fluid in the leaking tube, and any leak between a tube and a tube sheet will be observed by the appearance of fluid at the tube sheet.

2. Apparatus as defined by claim 1, wherein said affixing means includes a flange coupling sealingly couplable to said housing flange and to said elastomeric sleeve.

3. Apparatus as defined by claim 2, wherein said affixing means includes an annular assembly with a plurality of radial segments, each segment having a plurality of radial sections and each section pivotally coupled to an adjacent section, each section in cross-section having a pair of side walls whose interior surfaces diverge toward an open end thereof and contact flanges of said flange coupling and said housing intermediate said side walls and wherein each segment is coupled to an adjacent segment by tensioning means.

4. Apparatus as defined by claim 3, wherein said flange assembly includes a pair of spaced apart rings on a flange of said flange coupling forming a seal groove therebetween and a resilient seal slidably, snugly insertable in said groove and, of a thickness greater than that of said rings such that upon tightening the flange of said flange coupling to said housing flange, said seal compresses and seals said housing flange to the flange of said flange coupling.

5. Apparatus as defined by claim 4, wherein said flange coupling includes a cylindrical coupling sleeve slidably engagable with said elastomeric sleeve and both of said sleeves having bolt holes spaced therearound alignable upon engagement of said sleeves and such that upon being bolted together said coupling sleeve and said elastomeric sleeve become sealed together.

6. Apparatus as defined by claim 3, wherein said tube sheet seal is an annular sleeve with opposed lips for engaging a periphery and a portion of side walls of said tube sheet periphery.

7. Apparatus of defined by claim 2, wherein said tube sheet sealing means includes a resilient tube sheet seal clamp for engaging a periphery of said tube sheet and a clamp for clamping said elastomeric sleeve around said tube sheet seal and said tube sheet periphery.

8. A method of leak testing a heat exchanger of a type having a housing containing a plurality of tubes supported at one end by a floating tube sheet and at another by a fixed tube sheet, sealed to said housing, comprising:
 (a) exposing both tube sheets;
 (b) sealing the periphery of said floating tube sheet to said housing;
 (c) pressurizing the chamber around said tubes and between said tube sheets with fluid; and
 (d) locating fluid leaking out of said tubes and between said tubes and said tube sheets.

9. A method as defined by claim 8, wherein said sealing step includes joining said floating tube to said housing with an elastomeric sleeve for allowing for movement of said tube sheet due to expansion, contraction and bending.

10. A method as defined by claim 9, wherein said sealing step includes clamping a flange coupling sealed to said elastomeric sleeve to a flange of said housing so as to permit shifting of said flange coupling relative to said housing and at the same time maintaining a seal between said flange coupling and said housing.

* * * * *